United States Patent
Soejima

(10) Patent No.: US 7,110,797 B2
(45) Date of Patent: Sep. 19, 2006

(54) MULTIFUNCTION CELLULAR PHONE

(75) Inventor: Yukiyoshi Soejima, Tokyo (JP)

(73) Assignee: UME Insurance Inc., Newark, DE (US)

( * ) Notice: Subject to any disclaimer, the term of this patent is extended or adjusted under 35 U.S.C. 154(b) by 126 days.

(21) Appl. No.: 10/988,345

(22) Filed: Nov. 12, 2004

(65) Prior Publication Data
US 2005/0107142 A1 May 19, 2005

(30) Foreign Application Priority Data
Nov. 14, 2003 (JP) ............... 2003-385698

(51) Int. Cl.
H04M 1/00 (2006.01)
H04M 3/00 (2006.01)
H04B 1/38 (2006.01)

(52) U.S. Cl. ............... 455/575.1; 455/575.3; 455/575.4; 455/90.3; 455/550.1; 379/433.13; 379/433.04; 379/433.07

(58) Field of Classification Search ............ 455/575.3, 455/575.1, 575.4, 90.3, 517, 569.2, 550.1; 379/433.13, 433.04, 433.07
See application file for complete search history.

(56) References Cited

U.S. PATENT DOCUMENTS

2003/0211868 A1* 11/2003 Wu et al. ............ 455/572
2003/0223576 A1* 12/2003 Totani ............ 379/433.04
2004/0203527 A1* 10/2004 Matsumoto ............ 455/90.3

FOREIGN PATENT DOCUMENTS

JP 2001-313705 11/2001
JP 2001-339499 12/2001

* cited by examiner

Primary Examiner—Nick Corsaro
Assistant Examiner—Sayed T. Zewari
(74) Attorney, Agent, or Firm—Flynn, Thiel, Boutell & Tanis, P.C.

(57) ABSTRACT

The invention provides a portable and compact multifunction cellular phone that can include both a cellular phone function and a large number of other functions and is integrally provided with a function for enjoying games, music, images, data, and the like. The multifunction cellular phone is characterized in that a left side operation board, a display, and a right side operation board are layered and mounted on a hinge section so as to open and close freely, respectively, display sections of at least numerals, characters, symbols, and the like applicable to a cellular phone are arranged on the left or the right operation board and display sections of numerals, characters, symbols, operations buttons, and the like for operating other functions are arranged on the operation board on the other side, and the display is rotatable and/or movable in order to handle the cellular phone and the other functions or display screens are formed on front and rear surfaces of the display, respectively.

12 Claims, 5 Drawing Sheets

MULTIFUNCTION CELLULAR PHONE

BACKGROUND OF THE INVENTION

1. Field of the Invention

The present invention relates to a multifunction cellular phone that makes it possible for a user to enjoy games, music, images, data, and the like and even the aged, the aurally handicapped, and the visually handicapped can use.

2. Description of the Related Art

As a cellular phone, one having not only a function as a portable, compact, and small-sized telephone but also a function as an information transmitter receiver and various arithmetic storage functions is widely used. In addition, a cellular phone having software for games and music incorporated in advance and making it possible for a user to enjoy the games and the music are also used. However, since a quantity of software is limited and unnecessary game and music are often incorporated, the user cannot enjoy games and music that suit his/her own taste.

Moreover, volume is low for the aurally handicapped, and a dial to be operated is small, illegible, and hard to handle for the aged and the visually handicapped.

When it is attempted to make it possible for the aurally handicapped and the visually handicapped to use the function for enjoying games and music and the function for enjoying images and data, it is necessary to prepare a special cellular phone dedicated for that purpose. This is uneconomical for manufacturers.

In addition, since a cellular phone is required to be reduced in size and weight, keys for finger operation serving as input sections are extremely small. Moreover, a cellular phone having touch panel type input sections, which are still very small, instead of these keys for finger operation is also used. Consequently, key operation is extremely difficult. In particular, in the case of email transmission, key operation is difficult and takes a lot of time and mistyping tends to occur compared with email transmission and the like by a personal computer. Key operation is particularly difficult for the aged and the visually handicapped (see, for example, JP-A-2001-313705 and JP-A-2001-339499).

SUMMARY OF THE INVENTION

The invention provides a cellular phone that has a function inherent in cellular phones and a function for enjoying games, music, images, and data and makes it possible even for the aged, the aurally handicapped, and the visually handicapped to enjoy the games, music, images, and data. When the cellular phone is used as a telephone, display sections of numerals, characters, symbols, and the like, which are the same as those in the past, are used as operation keys. However, in particular, when a user enjoys games, music, images, data, and the like, the invention makes it possible for the user to use operation keys separate from the operation keys of the cellular phone and use various kinds of information exchange means having larger amount of information incorporated therein such as a disk and a card.

In addition, when the aged and the aurally handicapped use the cellular phone, the invention makes it possible for the aged and the aurally handicapped to enjoy games, music, images, data, and the like using a cellular phone with a loud speaker function or an earphone. Moreover, when the aged and the visually handicapped operate characters, symbols, and the like, the invention makes it possible to use operation keys excellent in operability providing display sections that are large as display sections for a cellular phone. As described above, while keeping the function as a telephone of a cellular phone, the invention provides the functions for enjoying games, music, images, and data in the cellular phone and makes it possible for the aurally handicapped and the visually handicapped to enjoy the games, music, images, and data. For that purpose, the invention provides an operation panel for the functions other than an operation panel for the cellular phone.

As described above, it is an object of the invention to provide a multifunction cellular phone that realizes improvement of input operability at the time when keys are used many times in a cellular phone and has a large number of other functions.

More specifically, the invention provides a multifunction cellular phone that, when the cellular phone is used as a telephone, makes it possible to use the cellular phone in substantially the same compact state as in the past and, when a user enjoys games, music, images, data, and the like or the aged, the aurally handicapped, and the visually handicapped use the cellular phone, makes it possible for the user to enjoy the games, music, images, data, and the like or the aged, the aurally handicapped, and the visually handicapped to use the cellular phone by using another operation panel.

The invention has been devised in order to attain the objects mentioned above. More specifically, the invention provides a multifunction cellular phone which is characterized in that a left side operation board, a display, and a right side operation board are layered and mounted on a hinge section so as to open and close freely, respectively, display sections of at least numerals, characters, symbols, and the like applicable to a cellular phone are arranged on the left or the right operation board and display sections of numerals, characters, symbols, operations buttons, and the like for operating other functions are arranged on the operation board on the other side, and the display is rotatable and/or movable in order to handle the cellular phone and the other functions or display screens are formed on front and rear surfaces of the display, respectively.

The multifunction cellular phone is characterized in that the left and the right operation boards and the display move in a direction perpendicular to front and rear surfaces of each of the left and the right operation boards and the display to be layered and mounted so as to open and close freely.

The multifunction cellular phone is characterized in that the left and the right operation boards and the display move in a direction along front and rear surfaces of each of the left and the right operation boards and the display to be layered and mounted so as to open and close freely.

The multifunction cellular phone is characterized in that the display is joined to the hinge section by pins and a display screen is rotatably disposed in a position opposed to the left or the right operation board.

The multifunction cellular phone is characterized in that the display is movable to a corner along an edge of the left or the right operation board and rises freely.

The multifunction cellular phone is characterized in that the display is formed to be rotatable around a hinge section side corner of the left or the right operation board.

The multifunction cellular phone is characterized in that screens corresponding to the left and the right operation boards are formed on front and rear surface sides of the display, respectively.

The multifunction cellular phone is characterized in that the display is formed to be rotatable along a side edge of the display.

The multifunction cellular phone is characterized in that buttons for game operation are disposed on the operation boards and memory card insertion holes for game software are formed in the operation boards.

The multifunction cellular phone is characterized in that operation buttons for music, images, and data are disposed on the operation boards and memory card insertion holes for software for the music, images, and data are formed in the operation boards.

The multifunction cellular phone is characterized in that software for games, music, images, and data and cassettes having operation means for the software are mounted on the operation boards so as to be detachably attachable.

The multifunction cellular phone is characterized in that numerals, characters, symbols, operation buttons, and the like, which are represented to be large and clear, are disposed and any one of or some of a loud speaker, an earphone, and emergency communication means are provided in the operation boards or the display opposed to the operation boards.

DESCRIPTION OF THE PREFERRED EMBODIMENTS

Embodiments of a multifunction cellular phone of the invention will be hereinafter described in detail with reference to the accompanying drawings.

First Embodiment

Figure 1:
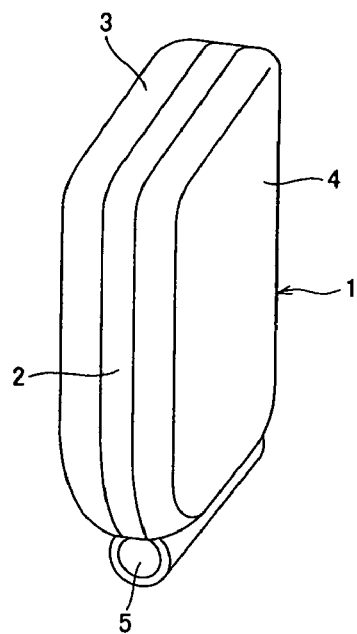
FIG. 1 is a perspective view of a state in which a multifunction cellular phone of the invention is closed.
Figure 2:
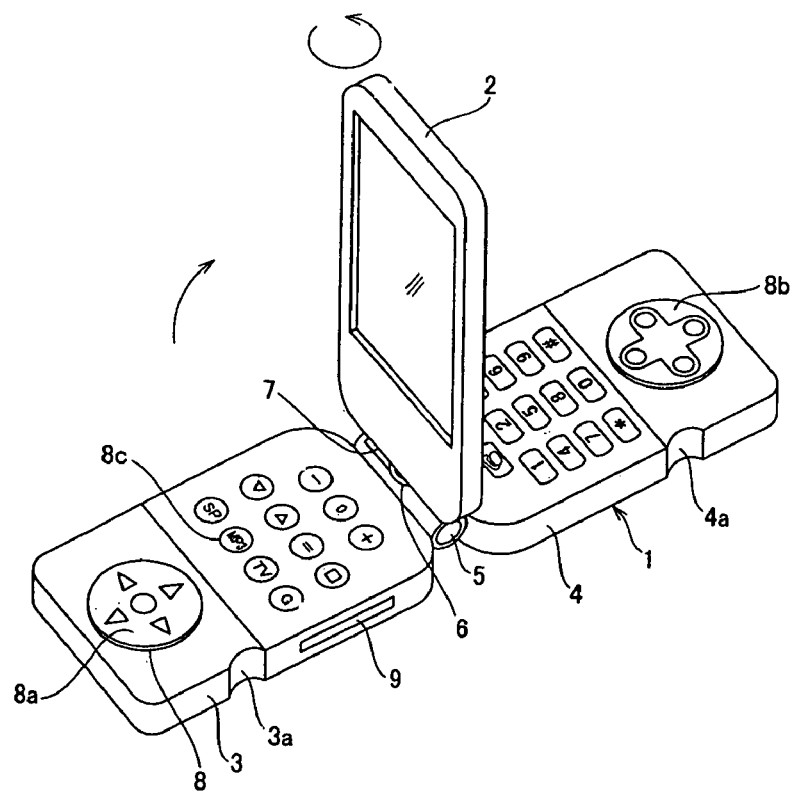
FIG. 2 is a perspective view of a case in which the multifunction cellular phone of the invention is opened and used.
Figure 3:
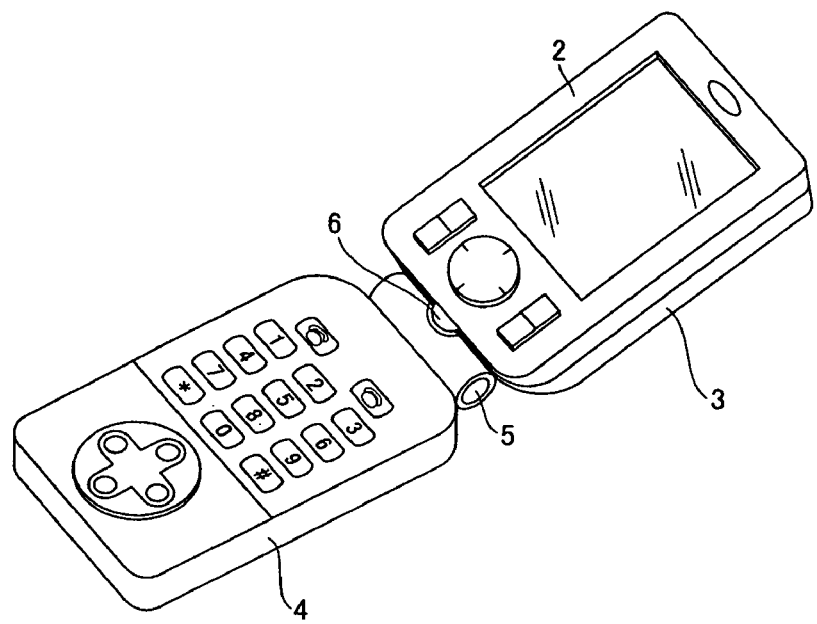
FIG. 3 is a perspective view of a case in which only an operation board on one side of the multifunction cellular phone of the invention is opened and the multifunction cellular phone is used as a telephone.

FIGS. 1 to 3 show an embodiment of the multifunction cellular phone of the invention. Reference numeral 1 denotes a multifunction cellular phone. The multifunction cellular phone 1 has a structural form in which operation boards and a display are layered and mounted with a shaft as a center. FIG. 1 is a perspective view of a state in which the operation boards and the display are layered. In this embodiment, the multiple function cellular phone has both a game function and a telephone function.

A display 2 is arranged in a position to be a center at the time of polymerization, and a left side operation board 3 and a right side operation board 4 are arranged so as to cover front and rear surface sides of the display 2. The display 2 and the left and the right operation boards 3 and 4 are rotatably coupled to a hinge section 5 serving as a shaft. FIG. 2 shows a perspective view of a state in which the left and the right operation boards 3 and 4 are expanded. A ball-like projection 6 is formed on a base end side of the display 2. The ball-like projection 6 is formed to rotatably fit in the center of the hinge section 5 so as to be able to rotate in a 180° direction. Therefore, it is possible to rotate the display 2 180°, whereby it is possible to dispose the display 2 in a position where a screen of the display 2 is opposed to the operation boards 3 and 4 expanded to the left and the right. A rotating direction may be clockwise or counter clockwise.

In FIG. 2, when the display 2 is rotated 180° to rotate the operation board 3 in an arrow direction with the hinge section 5 as a shaft and bring the operation board 3 into a state in which the operation board 3 is placed on a rear surface side of the display 2, as shown in FIG. 3, the screen of the display 2 appears to be opposed to the operation board 4. The multifunction cellular phone serves as a cellular phone. Therefore, usually, the operation board 3 and the display 2 are placed one on top of another such that this state is obtained.

On the other hand, when a user enjoys a game, the user rotates the display 2 180° from the position where the multifunction cellular phone is used as a cellular phone, and places the operation board 4 on the rear surface side of the display 2 such that the screen of the display 2 appears to be opposed to the operation board 3 for games.

Figure 4:
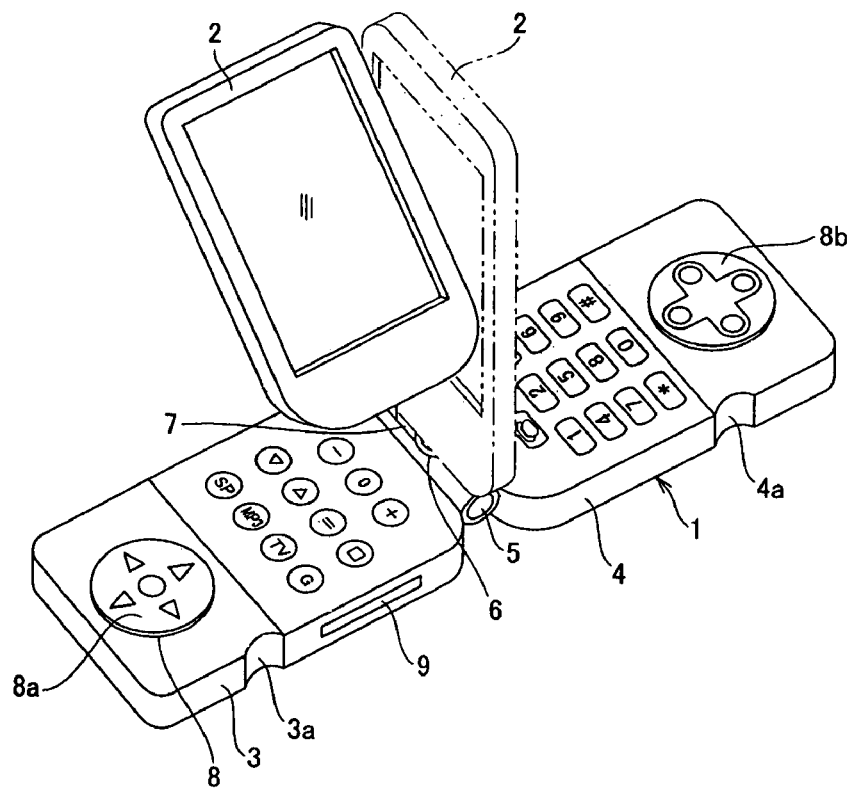
FIG. 4 is a perspective view of another embodiment of a case in which left and right operation boards of the multifunction cellular phone of the invention are opened and the multifunction cellular phone is used as a game machine.

In addition, in the state shown in FIG. 2, the user can enjoy the game by rotating the display 2 in a 90° direction (counterclockwise direction in the figure), moving a position of the display 2 along a slide groove 7 formed in the hinge section 5 to bring the display 2 into a state shown in FIG. 4, and operating respective operation buttons 8 (8a, 8b, ...) on the operation boards 3 and 4.

Moreover, the user can enjoy more various games by inserting a media stick, a compact flash (registered trademark), a card, and the like in memory card insertion holes 9 formed in the operation boards 3 and 4 and operating the various operation buttons 8.

Second Embodiment

In FIG. 2, image display means are provided on both sides of the display 2. This makes it possible for a user to handle other functions of a cellular phone, games, and the like without rotating the display 2.

Third Embodiment

In FIG. 2, recesses 3a and 4a are formed on sides of the operation boards 3 and 4 such that a user can easily grip a body of the multifunction cellular phone and operate the multifunction cellular phone. This can improve operability at the time when a user plays a game.

Fourth Embodiment

Figure 5:
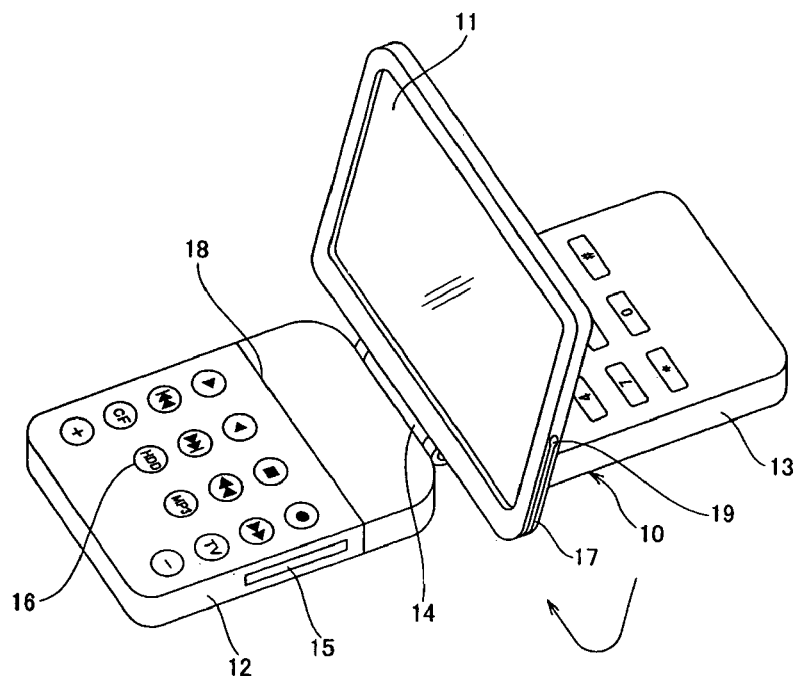
FIG. 5 is a perspective view of another embodiment of a case in which the multifunction cellular phone of the invention is used as means for obtaining music, images, and data.

FIG. 5 shows a multifunction cellular phone 10 that is used for music, moving image music, a digital video camera, a television, and a cellular phone. An operation board 12 and an operation board 13 are provided with a display 11 as a center. The display 11 is formed so as to be rotatable around a hinge section 14 as in the above description.

When a user uses the multifunction cellular phone 10 as a cellular phone, the user uses keys of the operation board 13 as in the first and the second embodiments.

On the other hand, when the user enjoys music, moving image music, and images of a digital video camera, a television, and the like, the user uses the multifunction cellular phone 10 in a state shown in FIG. 5. The user can enjoy music and images by inserting a media stick, a compact flash (registered trademark), a card, and the like in a memory card insertion hole 15 formed in the operation board 12 and operating various operation keys 16.

In addition, for example, when the user enjoys moving image music and images of a television, the user can move the display 11 along a groove 17 formed at a side edge of the display 11 to set the display 11 sideways as shown in FIG. 5. Consequently, it is possible to form a screen for a television of an aspect ratio of 9:16 with a screen size of 45 mm long and 80 mm wide.

It is also possible to upgrade music and image software or replace the music and image software with other software by forming the music and image software as a cassette and making the cassette detachably attachable to a body of the operation board 12 using a coupling section 18. The coupling section may be the hinge section 14.

In the case described above, it is also possible to obtain an image by bringing the display 11 into the state shown in FIG. 2 and reducing a size of the screen to be used as a screen for a television.

In addition, the user can use the multifunction cellular phone as a cellular phone and enjoy music and images by forming a front surface and a rear surface of the display 11 as image display means. Moreover, it is possible to rotate and use the display 11 for both the cellular phone and the music and images by providing a rotation hole 19 at an end of the groove 17 of the display 11.

Fifth Embodiment

Figure 6:
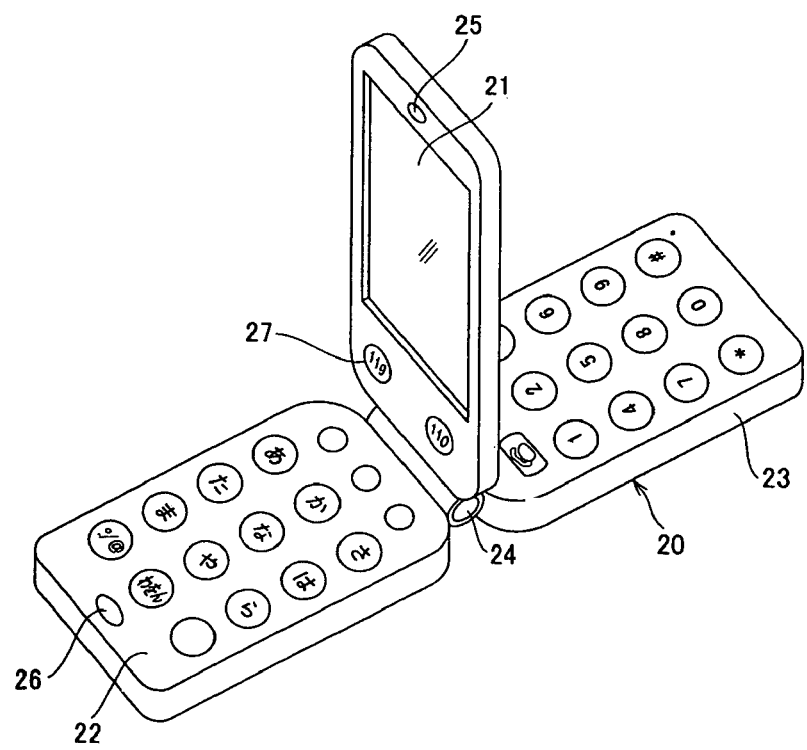
FIG. 6 is a perspective view of an embodiment of a case in which the multifunction cellular phone of the invention is used as a cellular phone for the aged and the handicapped.

FIG. 6 is a multifunction cellular phone 20 that is used mainly by the aged, the visually handicapped, and the aurally handicapped.

Operation boards 22 and 23 are provided on the left and the right with a display 21 as a center. As in the above description, the display 21 is made rotatable around a hinge section 24.

When a user uses the multifunction cellular phone 20 as a cellular phone, the user uses keys of the operation board 23 as in the embodiment described above.

In the keys of the operation board 23, numbers are displayed in a large size considering that the aged and the visually handicapped use the multifunction cellular phone 20. In some cases, it is also possible to increase a size of the operation boards 22 and 23 to display numbers. In addition, to clearly show numerals and symbols, light is emitted from the inside of the operation boards 22 and 23 or a black number on a white background or a white number on a black background is used.

On the other hand, Japanese hiragana characters are displayed on the operation board 22 in a large size such that the aged and the like can input characters easily.

As other functions, it is possible to intensify voice by providing a loud speaker 25 at a top end of the display for the aurally handicapped. In addition, terminals 26 coupling with the earphone are provided at lower ends of the operation boards 22 and 23.

Moreover, an emergency button 27 for emergency calls is formed at a lower end of the display 21 with which a finger does not usually come into contact. The loud speaker 25 and the emergency button 27 may be provided on base sides of the operation boards 22 and 23.

The display 21 may be a double-sided display, a rotatable display in FIG. 2, or a moving display that can move along a groove shown in FIG. 5.

Sixth Embodiment

Figure 7:
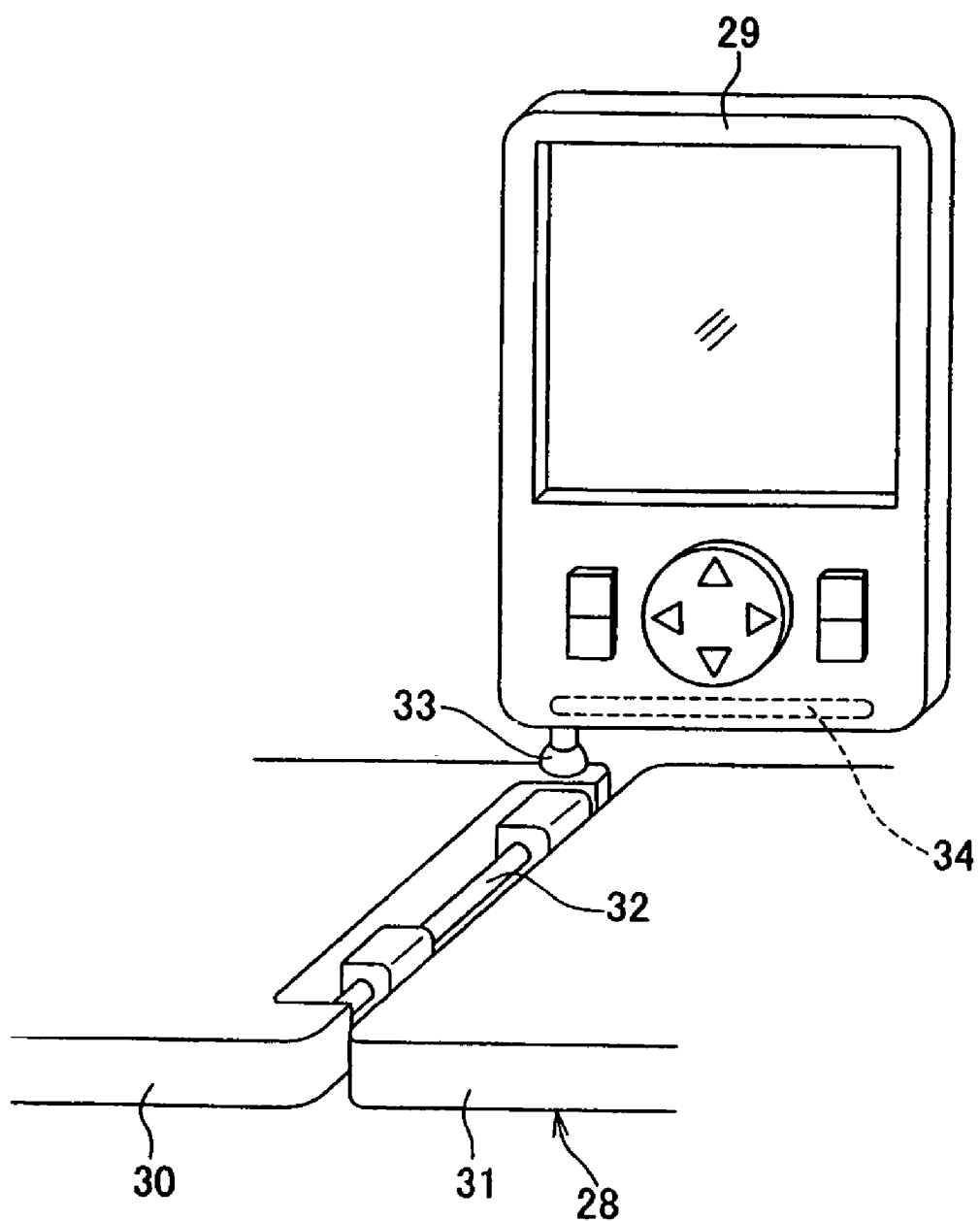
FIG. 7 is a perspective view showing a shaft section of another embodiment of the multifunction cellular phone of the invention.

FIG. 7 shows a part of a perspective view of another embodiment of the multifunction cellular phone. In a multifunction cellular phone 28, a display 29 is disposed in the center, and a left side operation board 30 and a right side operation board 31 are disposed on front and rear surface sides of the display 29 so as to be polymerizable. The operation boards 30 and 31 are mounted rotatably around a hinge section 32.

A rotation shaft 33 is formed in the hinge section 32 or at a corner on the hinge section 32 side of one of the left and the right operation boards 30 and 31, whereby the display 29 is made rotatable. A top end of the rotation shaft 33 is fit in the display 29 to be movable along a slide groove 34 of a lower end side of the display 29.

With the above-mentioned structure, the display 29 is made rotatable in the same manner as the left and the right operation boards 30 and 31, and it is possible to rotate a surface side of the display 29 in a 90° direction from the position in FIG. 7 to be opposed to the operation board 30 or 31. This makes it possible for a user to use the multifunction cellular phone 28 as a cellular phone and user the multifunction cellular phone 28 to enjoy games, music, images, data, and the like. In that case, the other operation board is placed on the rear surface side of the display 29.

An arrangement of display sections of numerals, characters, symbols, and the like in the left and the right operation boards 30 and 31 and other functions or various functions as a cellular phone are the same as those in the embodiments described above.

In the embodiments described above, it is needless to mention that the left and the right operation boards, the display, and the like are joined and integrated not only mechanically but also electrically.

Seventh Embodiment

Figure 8A:
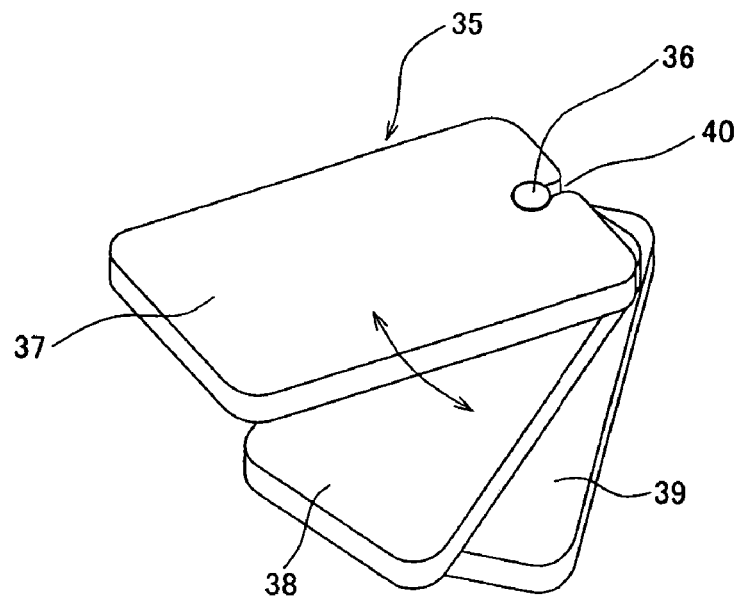
FIG. 8A is a perspective view of a state in which the left and the right operation boards and a display of the multifunction cellular phone of the invention is moved in a direction along front and rear surfaces thereof.
Figure 8B:
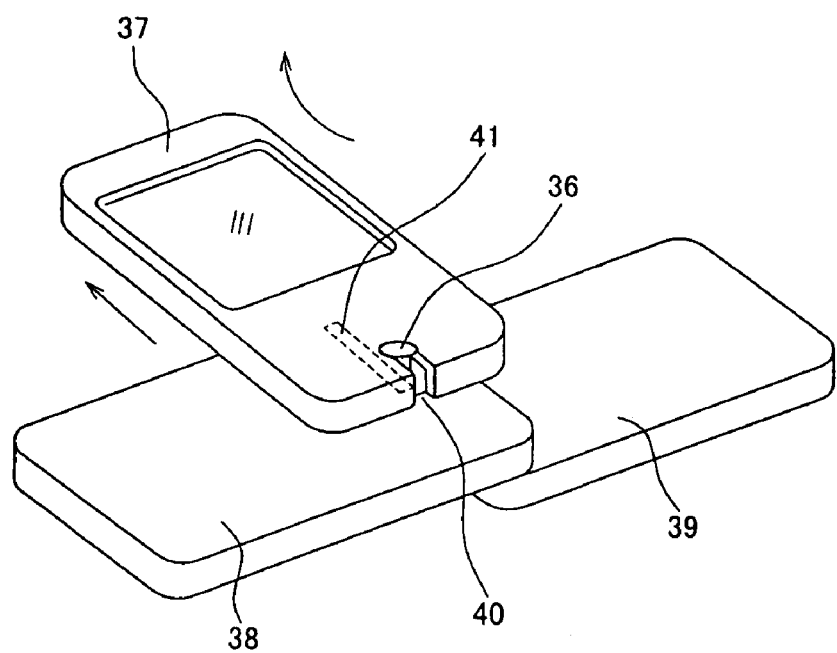
FIG. 8B is a perspective view showing a state in which the multifunction cellular phone of the invention is expanded.

FIGS. 8A and 8B show another embodiment of the multifunction cellular phone of the invention. Reference numeral 35 denotes a multifunction cellular phone. In the multifunction cellular phone 35, a display 37, a left side operation board 38, and a right side operation board 39 are layered and arranged with a shaft 36 as a center. In the seventh embodiment, the display 37 and the left and the right operation boards 38 and 39 are rotated in a direction along front and rear surfaces thereof with the shaft 36 as a center and locked in a position of polymerization.

In this embodiment, the display 37 on the surface side is moved along a rotation groove 40 continuously formed in the shaft 36, whereby it is possible to raise the display 37. In addition, in a position of the shaft 36 of the operation board 38 overlapping the display 37, a slide groove 41 is formed along a side edge of the operation board 38. The display 37 is moved along the slide groove 41, whereby it is possible to move the display 37 to end sides of the left and the right operation boards 38 and 39.

With the above-mentioned structure, the various display sections as indicated in the embodiments described above are provided in the left and the right operation boards 38 and 39. Numerals, characters, symbols, operation buttons, and the like for various games, music, images, data, and the like are disposed in the display sections other than those for use of the multifunction cellular phone as a cellular phone. In addition, it is also possible to provide a memory card insertion hole or a removable cassette or provide a loud speaker, an earphone, emergency communication means, and the like according to circumstances.

The invention provides a multifunction cellular phone that can include both a function as a cellular phone and other functions and is divided into three to be folded triply. When the multifunction cellular phone is used as a telephone, since display sections of numerals, characters, symbols, and the like, which are the same as those in the usual cellular phone, are arranged, it is possible to use the multifunction cellular phone according to the same operation as in the past. In addition, when a user enjoys games, music, images, and data using the cellular phone, the user can open and use other operation boards overlapping front and rear surfaces of a display. Thus, it is possible to sufficiently secure a space for arranging display sections dedicated for operation buttons, characters, symbols, and the like, it is possible to make the respective keys large, and operability of the keys is improved. Moreover, the display can be a dedicated display, and it is possible to slidingly rotate the display with respect to the operation boards as required to turn an image to the display section side as a horizontal image.

In addition, taking into account convenience of the aged and the visually handicapped, display sections are increased in size, dedicated key for input of the Japanese hiragana characters are provided, and the display sections are colored in noticeable colors or caused to emit light such that the aged and the visually handicapped easily select numerals, symbols, and characters easily from the display sections. Further, a loud speaker or an earphone is provided to make it possible for those who have hearing trouble to enjoy games, music, images, and data. Moreover, operation buttons for emergency calls are provided for exclusive use to make it possible to cope with emergencies.

What is claimed is:

1. A multifunction cellular phone, wherein a left side operation board, a display, and a right side operation board are layered and mounted on a hinge section so as to open and close freely, respectively, display sections of at least numerals, characters, symbols, and the like applicable to a cellular phone are arranged on the left or the right operation board and display sections of numerals, characters, symbols, operations buttons, and the like for operating other functions are arranged on the operation board on the other side, and the display is rotatable and/or movable in order to handle the cellular phone and the other functions or display screens are formed on front and rear surfaces of the display, respectively.

2. A multifunction cellular phone according to claim 1, wherein the left and the right operation boards and the display move in a direction perpendicular to front and rear surfaces of each of the left and the right operation boards and the display to be layered and mounted so as to open and close freely.

3. A multifunction cellular phone according to claim 1, wherein the left and the right operation boards and the display move in a direction along front and rear surfaces of each of the left and the right operation boards and the display to be layered and mounted so as to open and close freely.

4. A multifunction cellular phone according to claim 1, wherein the display is joined to the hinge section by pins and a display screen is rotatably disposed in a position opposed to the left or the right operation board.

5. A multifunction cellular phone according to claim 3, wherein the display is movable to a corner along an edge of the left or the right operation board and rises freely.

6. A multifunction cellular phone according to claim 1, wherein the display is formed to be rotatable around a hinge section side corner of the left or the right operation board.

7. A multifunction cellular phone according to claim 1, wherein screens corresponding to the left and the right operation boards are formed on front and rear surface sides of the display, respectively.

8. A multifunction cellular phone according to claim 1, wherein the display is formed to be rotatable along a side edge of the display.

9. A multifunction cellular phone according to claim 1, wherein buttons for game operation are disposed on the operation boards and memory card insertion holes for game software are formed in the operation boards.

10. A multifunction cellular phone according to claim 1, wherein operation buttons for music, images, and data are disposed on the operation boards and memory card insertion holes for software for the music, images, and data are formed in the operation boards.

11. A multifunction cellular phone according to claim 1, wherein software for games, music, images, and data and cassettes having operation means for the software are mounted on the operation boards so as to be detachably attachable.

12. A multifunction cellular phone according to claim 1, wherein numerals, characters, symbols, operation buttons, and the like, which are represented to be large and clear, are disposed and any one of or some of a loud speaker, an earphone, and emergency communication means are provided in the operation boards or the display opposed to the operation boards.

* * * * *